(12) United States Patent
Beck et al.

(10) Patent No.: US 12,172,562 B2
(45) Date of Patent: Dec. 24, 2024

(54) FRONT SEAT QUICK RELEASE ARMREST

(71) Applicant: The Braun Corporation, Winamac, IN (US)

(72) Inventors: Jonathan Paul Beck, Winamac, IN (US); Robert Earl Bettcher, III, Winamac, IN (US); Michael Todd Zindler, Kalamazoo, MI (US)

(*) Notice: Subject to any disclaimer, the term of this patent is extended or adjusted under 35 U.S.C. 154(b) by 352 days.

(21) Appl. No.: 17/544,347

(22) Filed: Dec. 7, 2021

(65) Prior Publication Data

US 2022/0176858 A1 Jun. 9, 2022

Related U.S. Application Data

(60) Provisional application No. 63/122,577, filed on Dec. 8, 2020.

(51) Int. Cl.
*B60N 2/75* (2018.01)
*B60R 21/207* (2006.01)

(52) U.S. Cl.
CPC ............... *B60N 2/787* (2018.02); *B60N 2/79* (2018.02); *B60R 21/207* (2013.01)

(58) Field of Classification Search
CPC .................................. B60N 2/75; B60N 2/787
See application file for complete search history.

(56) References Cited

U.S. PATENT DOCUMENTS

| 2002/0105217 | A1* | 8/2002 | Khedira | B60N 2/753 |
| | | | | 297/411.32 |
| 2005/0218686 | A1 | 10/2005 | Takenoshita et al. | |
| 2018/0072200 | A1* | 3/2018 | Bohlke | B60N 2/753 |
| 2019/0135144 | A1* | 5/2019 | Roeglin | B60N 2/787 |
| 2021/0394698 | A1 | 12/2021 | Tanabe et al. | |

FOREIGN PATENT DOCUMENTS

| CN | 105501088 A | * | 4/2016 | ............... B60N 2/75 |
| DE | 102005061254 A1 | * | 6/2007 | ........... B60N 2/4673 |
| DE | 102007014232 A1 | * | 10/2007 | ............ B60N 2/462 |
| DE | 102018127112 A1 | * | 4/2020 | ............ B60N 2/767 |
| EP | 3293043 A1 | * | 3/2018 | ............... B60N 2/75 |
| JP | H04125753 U | | 11/1992 | |

OTHER PUBLICATIONS

ISR/WO dated Mar. 17, 2022 for PCT/US2021/062176.

* cited by examiner

*Primary Examiner* — Timothy J Brindley
(74) *Attorney, Agent, or Firm* — Daniel Tallitsch

(57) ABSTRACT

An armrest assembly for a seat in a modified OEM vehicle. The armrest assembly includes an armrest support having a grommet and a detent pin, wherein the grommet includes a grommet aperture. An armrest includes an armrest aperture and a pin aperture; wherein the armrest aperture is configured to receive the grommet and the pin aperture is configured to receive the detent pin. A quick release connector extends through the grommet aperture and the armrest aperture, wherein the quick release connector includes an actuator to release the armrest from the armrest support. Engagement of the detent pin with the pin aperture prevents rotation of the armrest with respect to the armrest support.

15 Claims, 7 Drawing Sheets

FRONT SEAT QUICK RELEASE ARMREST

RELATED APPLICATIONS

This application claims the benefit of U.S. Provisional Patent Application Ser. No. 63/122,577, filed Dec. 8, 2020, entitled "Front Seat Quick Release Armrest," the disclosure of which is hereby incorporated by reference in its entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van or sport utility vehicle (SUV), include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle into a middle part of the vehicle where the seating arrangement has been removed to accommodate an individual using a wheelchair. Once inside the vehicle, individual who uses the assisted entrance can move from the wheelchair into the driver's seat to drive the vehicle.

In one known retrofitted vehicle, a row of middle seats or a bench seat is removed to accommodate a wheelchaired individual who will be driving. The driver's seat is replaced, or retrofitted, with a seat that rotates from a forward facing driver's position to a rear or passenger compartment facing position. To enable the individual to be seated in the driver's seat for driving, the driver's seat is rotated toward the location of the wheelchair in which individual is seated. The individual then moves from the wheelchair to the driver's seat and rotates the seat to a forward facing position for driving the vehicle.

It is understood that safety features of an OEM vehicle, when modified or retrofitted, must be maintained to insure passenger safety when accommodating a physically limited individual who is driving the retrofitted vehicle. What is needed therefore is replacement, modified, or retrofitted driver's side seat that includes safety features of the original OEM vehicle.

SUMMARY

In one embodiment of the present disclosure, there is provided an armrest assembly for a seat in a modified OEM vehicle. The armrest assembly includes an armrest support including a grommet and a detent pin, wherein the grommet includes a grommet aperture and an armrest. The armrest includes an armrest aperture and a pin aperture; wherein the armrest aperture is configured to receive the grommet and the pin aperture is configured to receive the detent pin. A quick release connector extends through the grommet aperture and the armrest aperture. The quick release connector includes an actuator to release the armrest from the armrest support and engagement of the detent pin with the pin aperture prevents rotation of the armrest with respect to the armrest support.

In another embodiment, there is provided a method of converting an OEM vehicle to a vehicle adapted to driven by an individual having a physical limitation requiring the use of a wheelchair. The method includes: removing a second row seat from the OEM vehicle; removing an armrest from the second row seat; attaching the armrest to a driver's seat with a quick release connector; and preventing rotation of the armrest with respect to the driver's seat.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
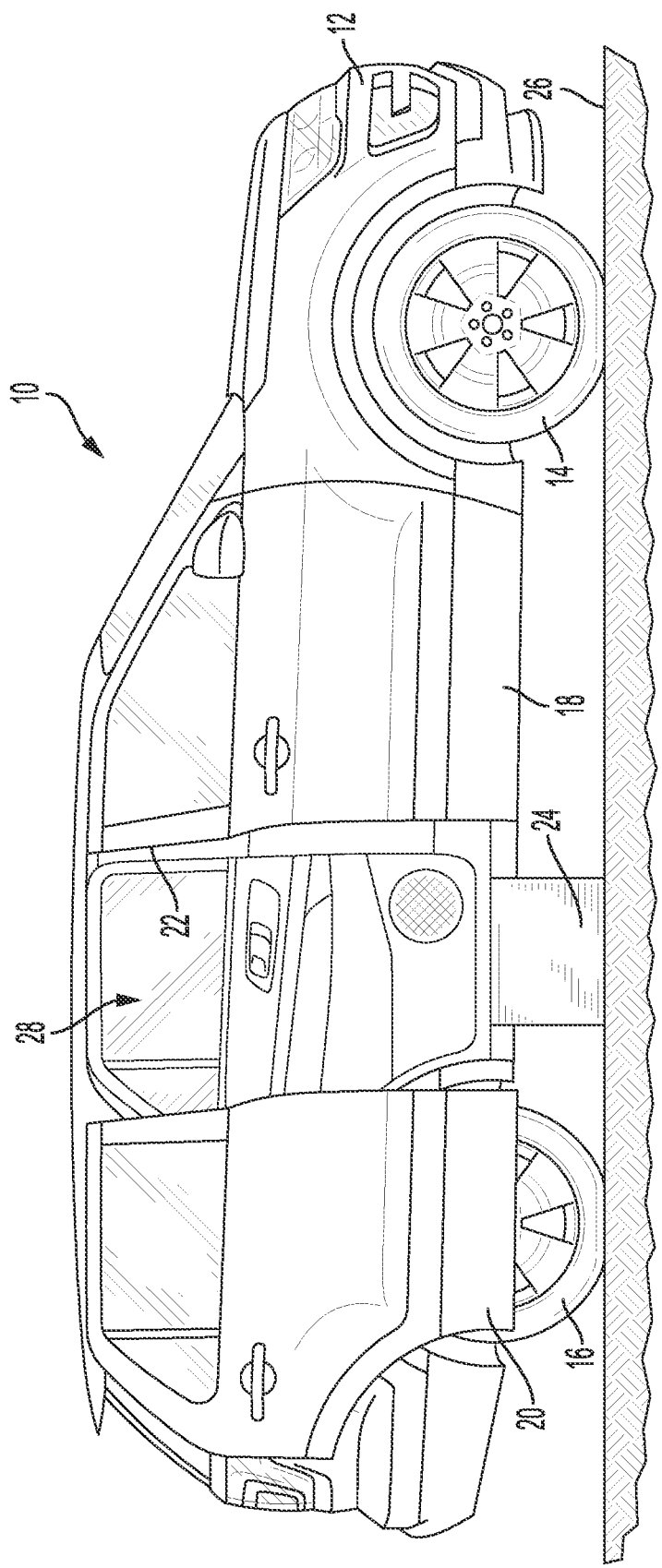
FIG. 1 illustrates an elevational side view of a sport utility vehicle including an access ramp.

FIG. 1 illustrates a sport utility vehicle (SUV) 10 available from any number of United States and foreign manufacturers. In the illustrated embodiment, the SUV, also called a crossover vehicle, includes a unibody construction, but other SUV's having a frame on body construction, are also included in the present disclosure. Consequently, the use of SUV herein includes all types and kinds of sport utility vehicles constructed with a body on frame construction, a unibody construction, or other constructions. In addition, while the SUV is illustrated in FIG. 1, the present disclosure is directed to all passenger vehicles carrying one or more passengers including vans.

FIG. 1 illustrates the SUV 10 including a body 12 operatively coupled to front wheels 14 and rear wheels 16. The SUV 10 includes a unibody construction. A first passenger side door 18 is located between the front wheels 14 and rear wheels 16 and provides access to a passenger for sitting in a front seat of the vehicle adjacent to the driver.

The SUV 10 has been modified to include a second passenger side door 20 coupled to the unibody frame through a mechanical linkage (not shown). In other embodiments, the side door 20 is coupled to the unibody frame through a sliding mechanism. In this embodiment, the second passenger side door has been modified to slide along a track (not shown) as opposed to the manufacturer supplied door which is hinged to swing away from the vehicle, as is understood by those skilled in the art. In addition to modifying the door 20 to slide along the track, an opening 22 to the interior, in some embodiments, is modified or widened to provide access to a passenger seated in a wheelchair. The opening is defined on the sides thereof by an edge of the door 20 and the edge of the door 18. The vehicle is further modified to include a ramp assembly 24 which provides rolling access of the wheelchair from pavement 26 into an interior 28 of the vehicle 10. The ramp assembly 24 is installed at the opening 22 and is movable between the interior of the vehicle, where it is stored in some embodiments, and to the exterior for wheelchair access.

In known modified vehicles, such as modified vans or SUVs, the middle row of seats is removed from the manufacturer supplied vehicle to enable access to a wheelchair supporting a passenger or a driver. Once the wheelchaired passenger or driver moves into the interior of the vehicle, the passenger or driver locates the wheelchair in the middle portion of the interior behind the driver seat and passenger seat of the front row.

Figure 2:
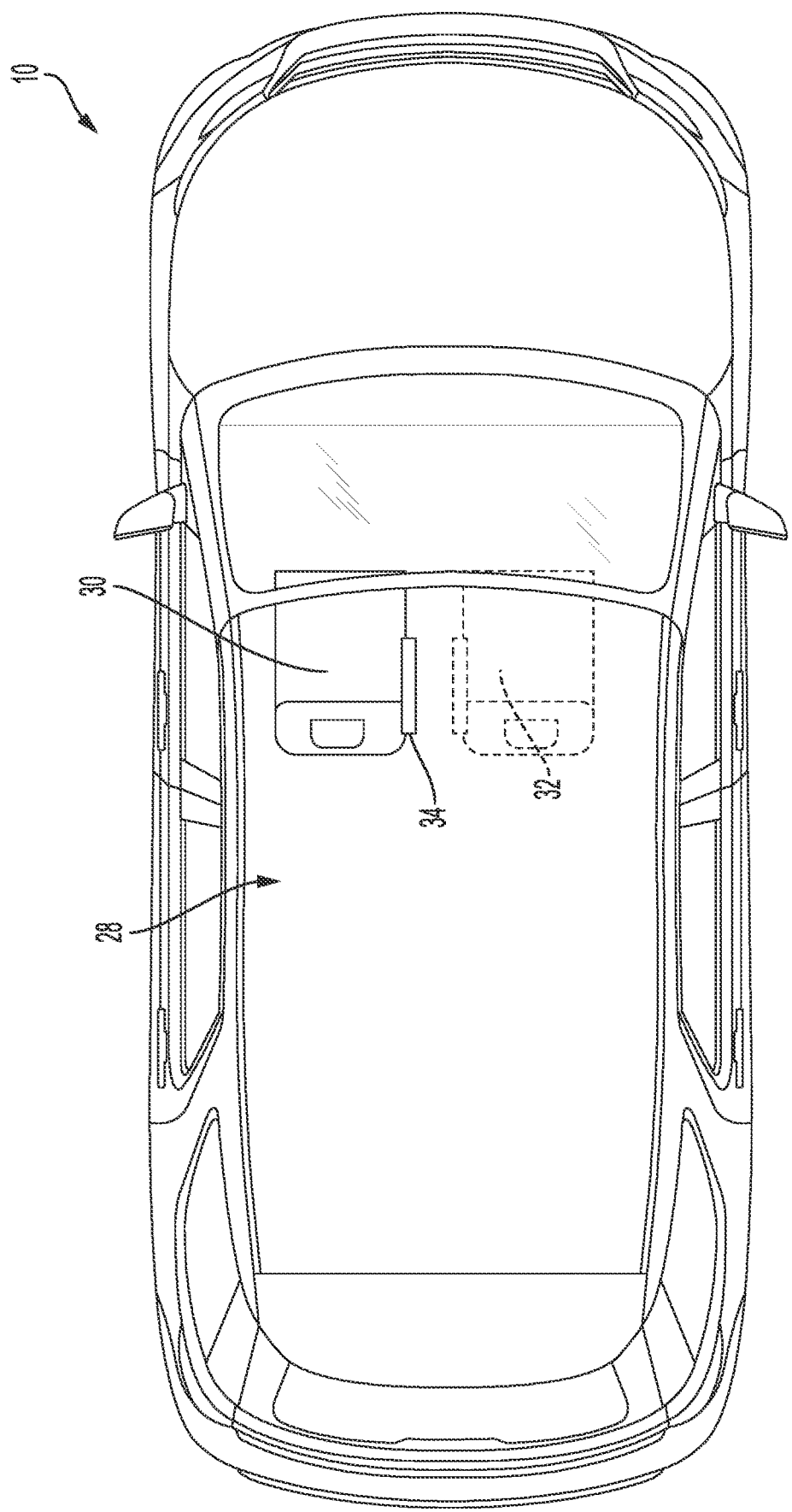
FIG. 2 illustrates a top plan sectioned view of a sport utility vehicle.

Over the past few years, the number of wheelchaired individuals who desire to lead full active lives has increased. To accommodate such individuals, the SUV has become a preferred vehicle of choice, particularly with military veterans who received disabilities during their tours of duty. Consequently, the SUV 10 is further modified or retrofitted as illustrated in FIG. 2 to provide a driver's side seat 30 configured to enable a wheelchaired individual to move from the interior location 28 to the driver's seat 30. In one embodiment, the driver's side seat 30 rotates about a pivotable base. The seat 30 is pivoted toward the driver, seated in the wheelchair, after which the driver moves to the driver's seat 30. Once seated, the seat 30 is rotated back into a forward facing position. The driver side seat 30 is located next to a passenger side seat 32, shown in outline. In one embodiment, the seat 32 is removed to accommodate a wheel chair. As seen in FIG. 2, the driver's side seat 30 includes a first armrest 34.

Figure 3:
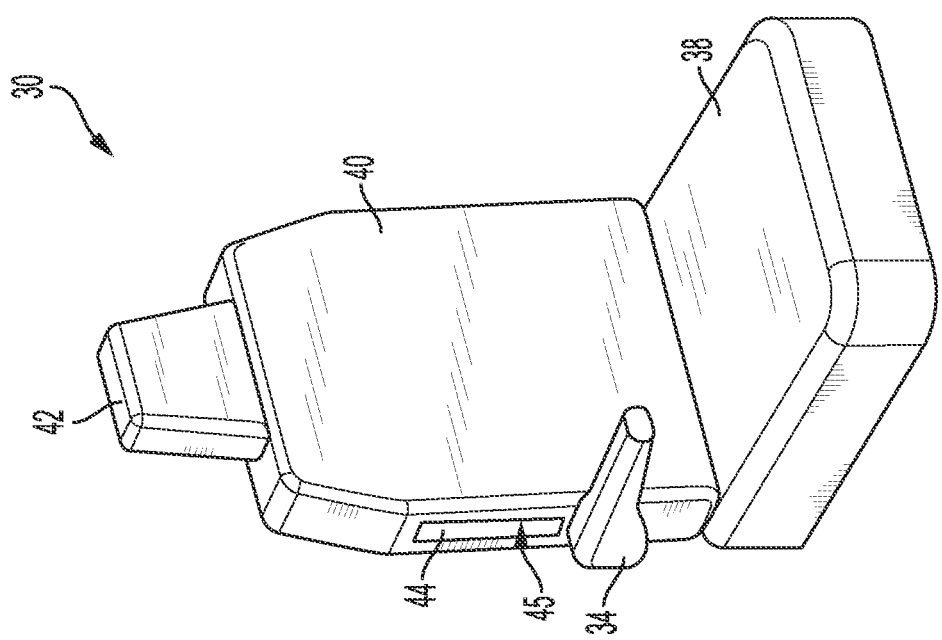
FIG. 3 illustrates a perspective front view of a driver's side seat.

As illustrated in FIG. 3, the seat 30 is one embodiment of an OEM seat having a seat base 38, a seat back 40, and a headrest 42, extending from the seat back 40. The seat back 40 includes an original seat back air bag (now shown) located within the back 40, that when actuated, is deployed through an air bag aperture 44, located at a side 45 of the seat 30, as is understood by one skilled in the art. Upon activation, the airbag moves through the aperture 44 and into a space adjacent to the driver's side seat 30.

In one or more embodiments, a center console located between the driver and passenger seat of the vehicle is removed to enable the conversion of the driver's side seat. In at least one vehicle, the console is removed which also removes the armrests, supported by the console, for both the driver and front seat passenger. In this situation, the previously available armrest for the driver's side seat is replaced with the armrest 34. The armrest for the passenger side seat is also replaced. To insure that the air bag is deployed properly, the OEM armrest 34, and its related assembly, is modified to reduce or eliminate the likelihood of the armrest 34 interfering with deployment of the airbag. In one embodiment, one of the OEM armrests from the second row of seats (that have been removed) is modified and attached to the driver's side seat as armrest 34. In another embodiment, OEM or replacement armrests are purchased and modified as described herein. A new armrest including the features described herein is also contemplated.

To enable the driver to move from the wheelchair to the driver's seat, the armrest should not block the movement of the driver either into or out of the driver's seat. Otherwise, the driver's transition into and out of the driver's seat is quite difficult, if not impossible. Since the armrest is being attached to the seat 30, it is important that the armrest is movable away from its horizontal position to a position that does not block movement of the driver into and out of the seat. While it is possible to move the OEM armrest from one of the second row seats to the driver's seat, the use of the OEM armrest presents additional problems. For instance, while the OEM armrest is configured to rotate in an upward direction, and therefore out of the way of the driver, rotation of the armrest when attached to the seat 30 tends to block expansion of the air bag from the aperture 44. Consequently, the OEM armrest and its support are modified as described herein.

Figure 4:
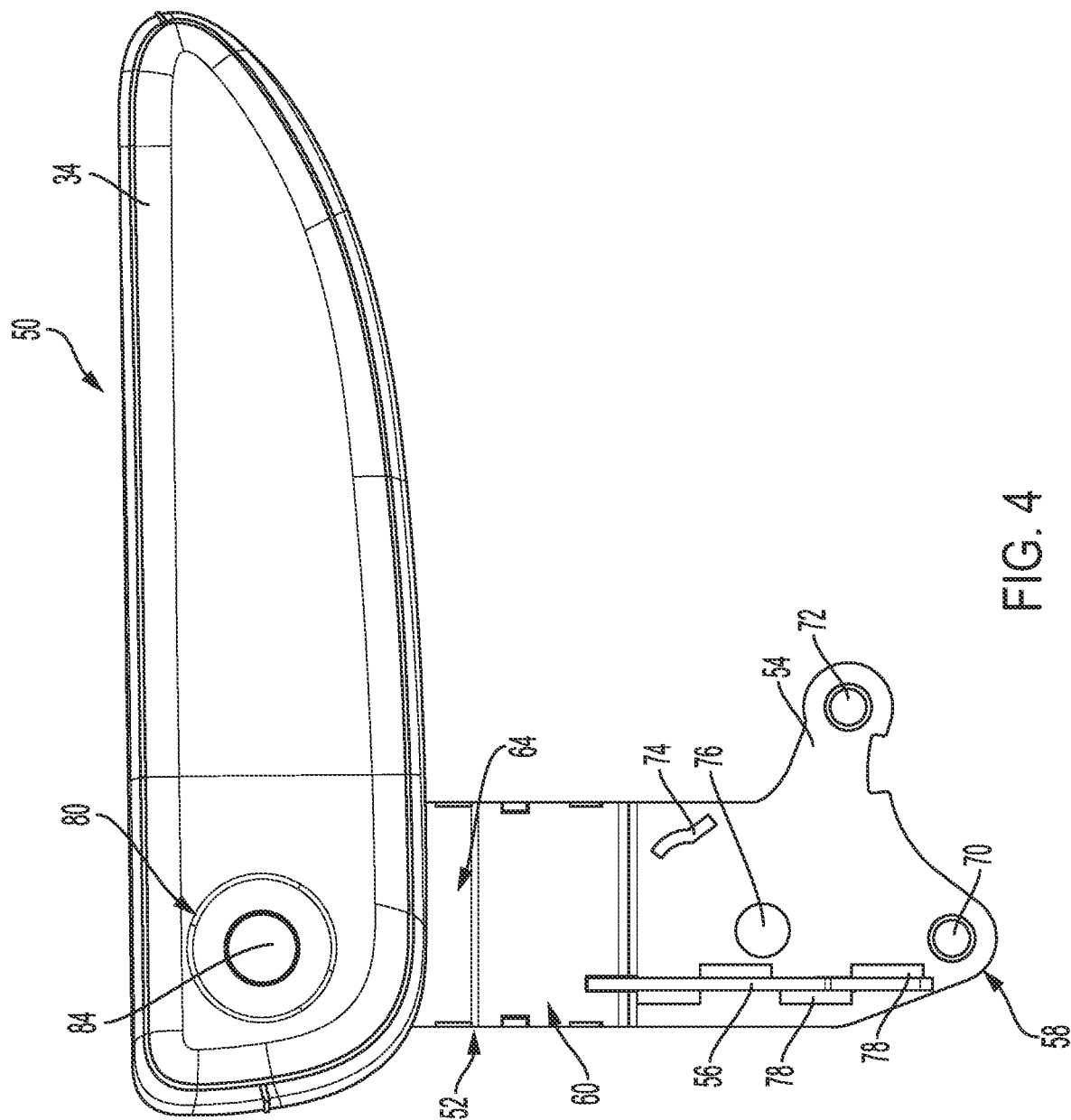
FIG. 4 illustrates a plan view of an armrest assembly.
Figure 5:
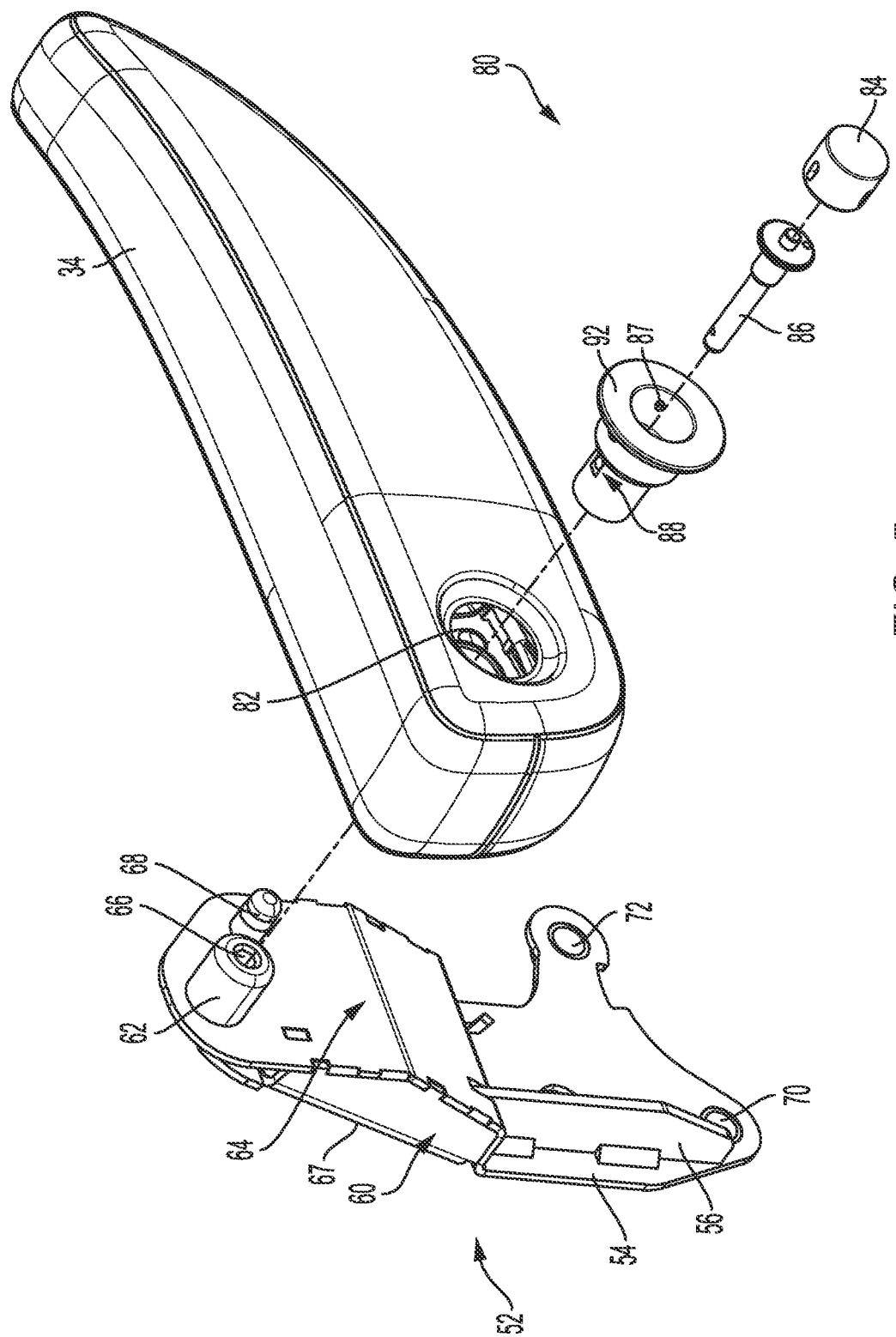
FIG. 5 illustrates an exploded perspective view of an armrest assembly.

FIGS. 4 and 5 illustrate an armrest assembly 50 including the armrest 34 shown in a horizontal position. The armrest assembly 50 is configured to enable the airbag to properly deploy and to thereby maintain the safety features of the seat 30. The armrest 34 is operatively connected to an armrest support 52 through a connector that allows a user to attach the armrest assembly 50 to the armrest support 52 in only one position, i.e. the horizontal position, and to remove the armrest assembly from the seat 30 as needed. The armrest 34 is movable from an attached position to a detached position and vice versa. The driver, or other individual, can detach the armrest 34 to enable the driver to move into the driver's seat, and can reattach the armrest 34 to the driver's seat once the driver is located in the seat 30.

In one embodiment, the armrest support 52 is a welded assembly configured to mount the armrest 34. The armrest support 52 includes a blade 54 having a generally flat profile which is supported by a lateral extension 56 extending generally perpendicularly from a surface of the blade 54 and extending along a length of the blade 54. The lateral extension 56 provides a rigid support for the blade 54 and generally extends from a bottom portion 58 to a grommet support 60. The grommet support 60 supports a grommet 62 which is welded to a face 64 of the support 62 as seen in FIG. 5. Other types of connections between the grommet support 60 and the grommet 62 are contemplated. The grommet 62, in one embodiment, is generally cylindrical and includes an aperture 66. In one embodiment, the grommet support 60 defines a back side 67 configured to mate with the side 45 of the seat 30. A detent pin 68 extends from the face 64. When the armrest 34 is coupled to the support 52, the pin 68 extends into an aperture of the armrest (not shown) that prevents rotation of the armrest 34 when mated to the support 52. In another embodiment, the detent pin extends from the armrest 34 and into an aperture of the armrest support. In one embodiment the support 52 a manufactured part not made as an OEM part. A modified OEM armrest support is also contemplated.

The blade 54 includes an aperture 70 and an aperture 72 each of which is configured to accept a connector (not shown) that extends through the blade 54 to hold the armrest assembly 50 to the seat back 40. The blade 54 further includes clearance features 74 and 76, each of which defines an aperture. Each of the features 74 and 76 respectively receives an extension (not shown) from a seat support (see FIG. 7, element 124) to locate and to maintain the position of the armrest assembly 50 with the seat 30. Welds 78 hold the lateral extension 56 to the blade 54.

The armrest 34 is detachably connected to the armrest support 52 by a quick release connector 80 that extends through an aperture 82 of the armrest 34. The quick release connector 80 is fixedly coupled to the armrest 34 such that the connector 80, and therefore armrest 34, are connected to and released from the grommet 62. The armrest 34 is coupled to the armrest support 52 by placing the aperture 82 over the grommet 62.

The connector 80 includes depressible member or pushbutton 84 that is operatively connected to a release pin 86, both of which extend into an aperture 87 of an adapter bushing 88. The pushbutton 84 is fixedly attached to the release pin 86 by connectors (not shown), such as screws, and the pushbutton 84/release pin 86 combination extends into the aperture 87. The pushbutton 84/release pin 86 combination is fixedly coupled to the adapter bushing 88 by couplers, not shown. The pin 86 includes one or more depressible contacts 90, such as bearings, that move in response to contact with an inside surface of the grommet 62 at the aperture 66. A spring (not shown) is located in the pin 86 to hold the contacts 90 in position or to release the contacts 90. By depressing or actuating the pushbutton 84, the contacts 90 release the pin 86 from being held by the grommet 62.

The adapter bushing 88 includes a flange 92 that engages the aperture 82. The press fit connects the connector 80 to the armrest 34, such that the armrest 34 and connector 80 are a single assembly that is attachable to the and detachable from the grommet 62 and therefore the seat 30. Pressing the pushbuttton 84 engages or disengages the pin 86 from the grommet 62 and therefor enables the armrest 34 to be attached to and removed from the seat 30.

Figure 6:
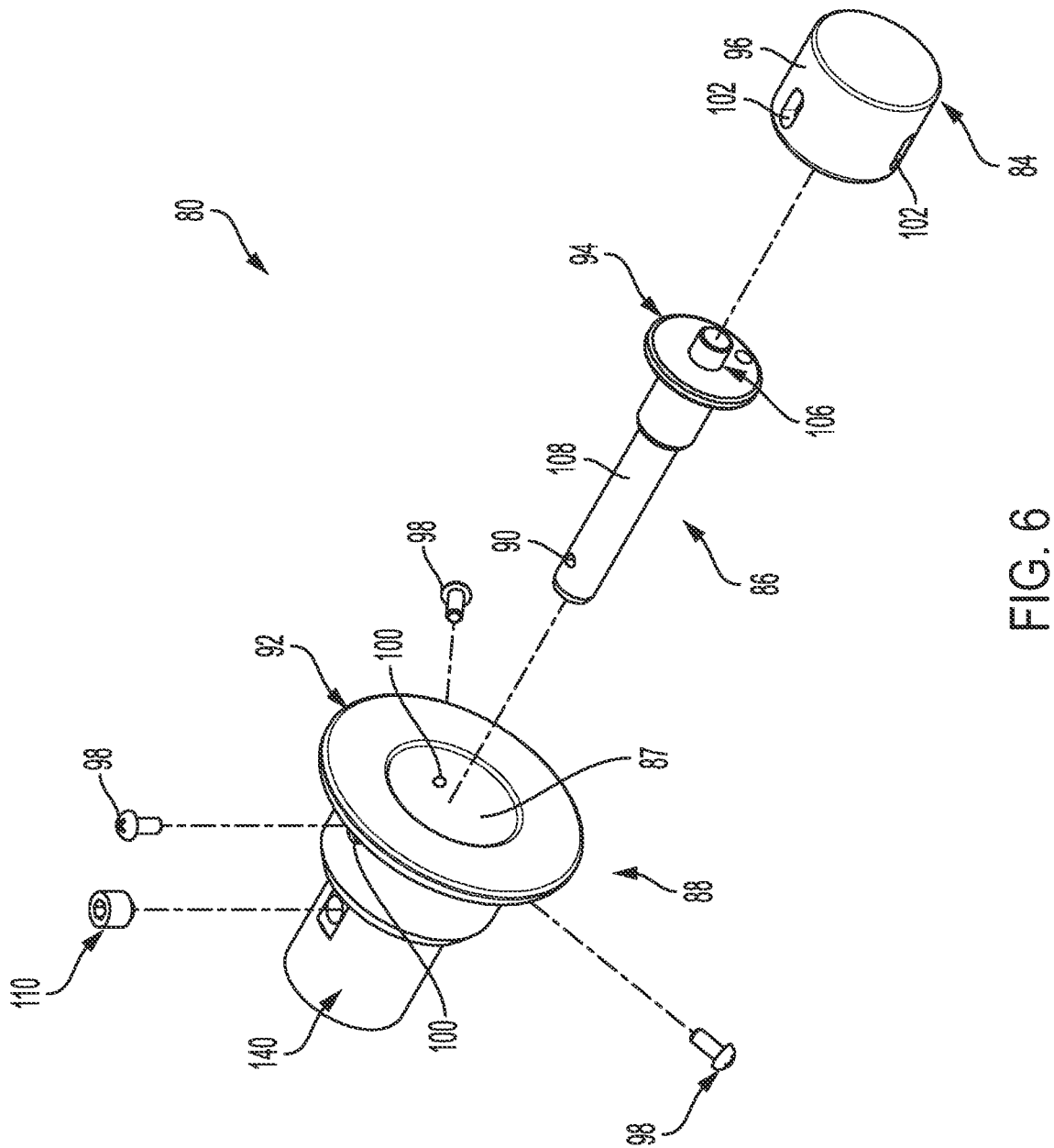
FIG. 6 illustrated an exploded perspective view of an armrest connector.

FIG. 6 illustrates additional details of the connector 80. The pushbutton 84 defines a cavity which includes a dimension sufficient to enable the pushbutton 84 to fit over a release pin flange 94. The pushbutton 84 includes an outer cylindrical portion 96 that slidingly fits within the aperture 87 and which is retained therein by one or more connectors 98. Each connector 98 extends through a hole 100 of the bushing 88 and further extends into a respective slot 102 of the pushbutton 84. Movement of the pushbutton 84 with respect to the adapter bushing 88 is limited by the connector 98 engaging either end of one of the respective slots 102. An interior surface of the pushbutton 84 engages, when placed over the release pin 86, a contact pin 106 that moves within a sleeve 108. Depending on the location of the contact pin 106 with respect to the sleeve 108, the depressible contacts 90 either engage with the grommet 62 or disengage from the grommet 62. The connector 80 is fixedly held within the aperture 82 of the armrest 34 by a connector, not shown. Fixing connector 80 to aperture 82 of armrest 34 is made with an adhesive to bond the outer diameter 140 of connector 80 to the inner diameter of aperture 82 of armrest 34. A set cup 110 is located in the adapter bushing 88 to secure the release pin 86, and to substantially prevent any movement of the pin 86 inward or outward of the bushing 88. With use of the pushbutton 84, the armrest 34 is removed from and attached to the seat 30 as needed to enable the driver to move into and out of the driver's seat without having to maneuver around a fixed armrest. In addition, by replacing an OEM rotatable armrest with the attachable and detachable armrest as described herein, the safety feature of the seat's side airbag is maintained.

Figure 7:
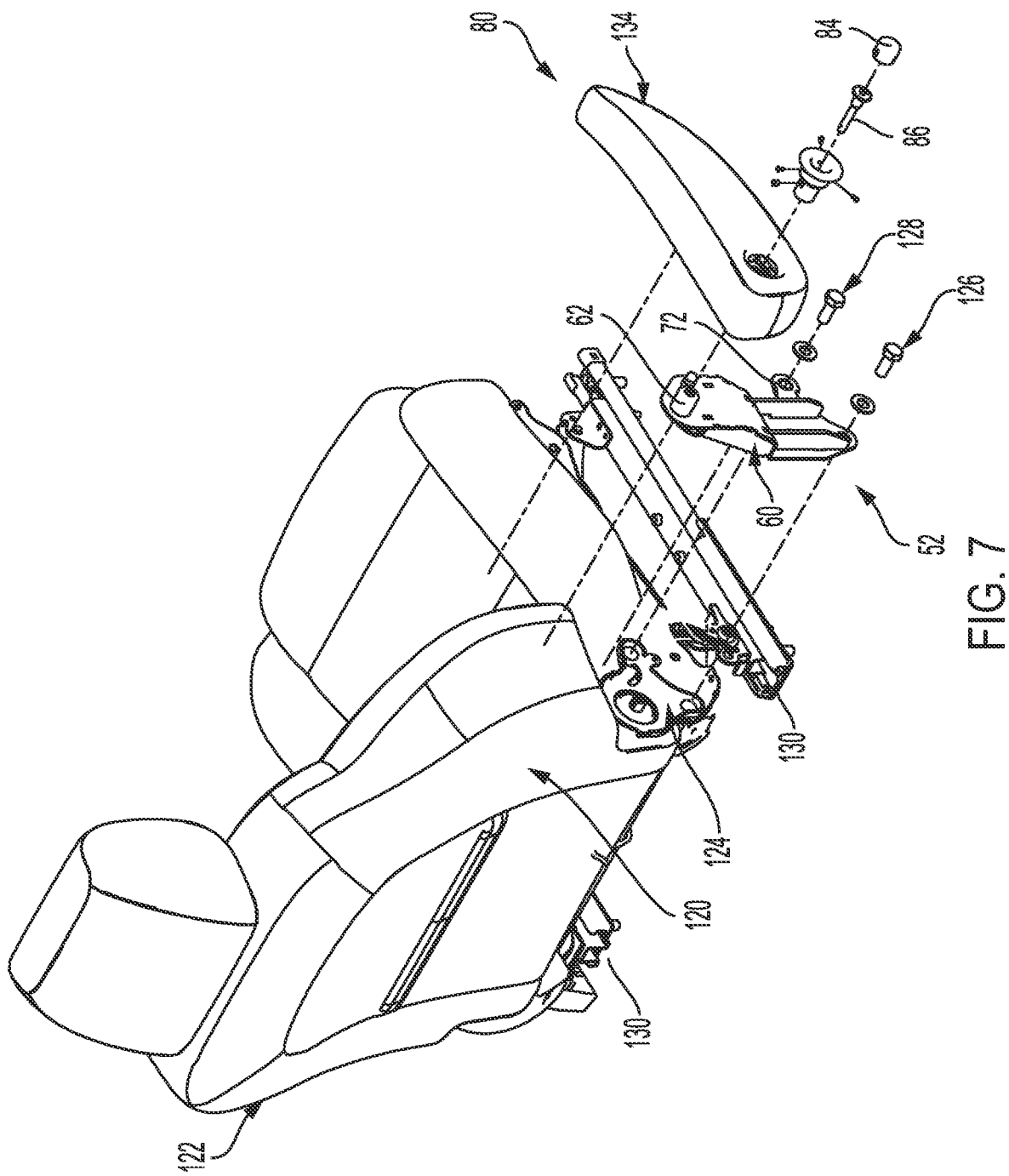
FIG. 7 illustrates the attachment of an armrest support to a side of an OEM seat.

FIG. 7 illustrates the attachment of the armrest support 52 to a side 120 of an OEM seat 122. As can be seen in FIG. 3 and FIG. 7, different types of seats are contemplated, i.e. seat 30 being of a different type than seat 122. The side 120 of seat 122 include an airbag as discussed with the seat 30 of FIG. 3. In FIG. 7, a seat bracket 124 is connected to the seat 122 by a first connector 126 and a second connector 128 each of which extends through apertures 70 and 72 of the armrest support 52. The first and second connectors extend into OEM locations of the seat 122 that are included with the OEM seat 122. As seen in FIG. 5, the back side 67 of support 52 is inclined, with respect to vertical, to contact the side 120 of seat 122, which is also inclined with respect to vertical. The seat 122 is supported by first and second slide mechanisms 130 each of which enables the seat 122 to move toward or away from the steering wheel. The slide mechanisms 130 are mounted on a base (not shown) that includes a rotating support assembly to enable the seat 122 to rotate toward the middle interior of the vehicle from the driving position facing forward. In the illustrated embodiment of FIG. 7, the seat 122, the seat bracket 124, and the slide mechanisms are OEM parts.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An armrest assembly for a seat in a modified OEM vehicle, the armrest assembly comprising:
   an armrest support including a blade having a surface, a grommet support coupled to the blade, and a detent pin extending from the grommet support;
   an OEM vehicle armrest including an armrest aperture and a pin aperture, wherein the detent pin extends through the pin aperture to prevent rotation of the OEM vehicle armrest with respect to the armrest supports; and
   a quick release connector extending through the armrest aperture and to the grommet support, wherein the quick release connector enables the OEM vehicle armrest to be releasably connected to the seat.

2. The armrest assembly of claim 1 wherein the armrest support includes a grommet supported by the grommet support and the quick release connector is releasably connected to the grommet support.

3. The armrest assembly of claim 2 wherein the quick release connector includes an adapter bushing that extends through the armrest aperture and is retained therein, wherein the adapter bushing receives the grommet.

4. The armrest assembly of claim 3 wherein the quick release connector includes a release pin that extends through the adapter bushing to engage the grommet support.

5. The armrest assembly of claim 4 wherein the quick release connector includes a pushbutton connected to the release pin, wherein pressing the pushbutton disengages the release pin from the grommet to enable the OEM armrest to be removed from the seat.

6. The armrest assembly of claim 5 wherein the release pin includes depressible contacts that disengage from the grommet in response to actuation of the pushbutton.

7. The armrest assembly of claim 1 wherein the grommet support includes a backside inclined with respect to the blade, wherein the inclined back side is adapted to contact a side of the seat.

8. The armrest assembly of claim 7 wherein the armrest support includes a plurality of apertures each of which are adapted to receive a connector to connect the armrest support to a seat bracket attached to the seat.

9. The armrest assembly of claim 8 wherein the OEM vehicle armrest is an OEM vehicle armrest from a second row seat of an OEM vehicle.

10. A modified OEM vehicle modified from an OEM vehicle comprising:
   a front seat for a driver including an air bag deployed through an air bag aperture located on a side of the front seat;
   an armrest support including a blade having a surface, a grommet support coupled to the blade, and a detent pin extending from the grommet support;
   an OEM vehicle armrest including an armrest aperture and a pin aperture, wherein the detent pin extends through the pin aperture to prevent rotation of the OEM vehicle armrest with respect to the armrest support; and
   a quick release connector extending through the armrest aperture and to the grommet support, wherein the quick release connector enables the OEM vehicle armrest to be releasably connected to the seat.

11. The modified OEM vehicle of claim 10 wherein the armrest support includes a grommet supported by the grommet support and the quick release connector is releasably connected to the grommet support.

12. The modified OEM vehicle of claim 11 wherein the quick release connector includes an adapter bushing that extends through the armrest aperture and is retained therein, wherein the adapter bushing receives the grommet.

13. The modified OEM vehicle of claim 12 wherein the quick release connector includes a release pin that extends through the adapter bushing to engage the grommet support.

14. The modified OEM vehicle of claim 13 wherein the quick release connector includes a pushbutton connected to the release pin, wherein pressing the pushbutton disengages the release pin from the grommet to enable the OEM armrest to be removed from the seat.

15. The modified OEM vehicle of claim 14 wherein the release pin includes depressible contacts that disengage from the grommet in response to actuation of the pushbutton.

* * * * *